(12) United States Patent
Porter et al.

(10) Patent No.: US 7,321,856 B1
(45) Date of Patent: Jan. 22, 2008

(54) HANDLING OF SPEECH RECOGNITION IN A DECLARATIVE MARKUP LANGUAGE

(75) Inventors: Brandon W. Porter, Mountain View, CA (US); Lisa Joy Stifelman, Mountain View, CA (US); Michael Bodell, Mountain View, CA (US); Matthew Talin Marx, Mountain View, CA (US); Bill Sutton, San Mateo, CA (US)

(73) Assignee: Microsoft Corporation, Redmond, VA (US)

( * ) Notice: Subject to any disclaimer, the term of this patent is extended or adjusted under 35 U.S.C. 154(b) by 100 days.

(21) Appl. No.: 11/197,483

(22) Filed: Aug. 3, 2005

(51) Int. Cl.
*G10L 15/22* (2006.01)

(52) U.S. Cl. .............. 704/270.1; 704/275; 379/88.04

(58) Field of Classification Search ........... 704/251, 704/260, 270, 270.1, 275; 715/500.1, 760
See application file for complete search history.

(56) References Cited

U.S. PATENT DOCUMENTS

| | | | |
|---|---|---|---|
| 5,873,064 A * | 2/1999 | De Armas et al. .......... 704/275 |
| 6,282,511 B1 | 8/2001 | Mayer | |
| 6,473,734 B1 * | 10/2002 | Dvorak ...................... 704/235 |
| 6,493,673 B1 | 12/2002 | Ladd et al. | |
| 6,636,831 B1 | 10/2003 | Profit et al. | |
| 6,717,593 B1 | 4/2004 | Jennings | |
| 6,728,675 B1 * | 4/2004 | Maddalozzo et al. ....... 704/258 |
| 6,862,710 B1 | 3/2005 | Marchisio | |
| 6,868,380 B2 | 3/2005 | Kroeker | |
| 6,874,018 B2 | 3/2005 | Wu | |
| 6,941,268 B2 | 9/2005 | Porter et al. | |
| 7,010,485 B1 * | 3/2006 | Baumgartner et al. ...... 704/251 |
| 7,143,039 B1 * | 11/2006 | Stifelman et al. ........... 704/270 |
| 2003/0147518 A1 | 8/2003 | Albal et al. | |

FOREIGN PATENT DOCUMENTS

| | | |
|---|---|---|
| EP | 0 847 179 A2 | 6/1998 |
| WO | WO 00/05643 | 2/2000 |

OTHER PUBLICATIONS

J.A. Larson, "VoiceXML 2.0 and the W3C Speech Interface Framework"; IEEE Workshop on Automatic Speech Recognition and Understanding, 2001; Dec. 9-13, 2001; pp. 5-8.

Mittendorfer et al.; "Making the VoiceWeb Smarter—Integrating Intelligent Component Technologies and VoiceXML"; Web Information Systems Engineering, 2001; Dec. 3-6, 2001; vol. 2; pp. 126-131.

* cited by examiner

Primary Examiner—Martin Lerner
(74) Attorney, Agent, or Firm—Perkins Coie LLP

(57) ABSTRACT

Declarative markup languages for speech applications such as VoiceXML are becoming more prevalent programming modalities for describing speech applications. Present declarative markup languages for speech applications model the running speech application as a state machine with the program specifying the transitions amongst the states. These languages can be extended to support a marker-semantic to more easily solve several problems that are otherwise not easily solved. In one embodiment, a partially overlapping target window is implemented using a mark semantic. Other uses include measurement of user listening time, detection and avoidance of errors, and better resumption of playback after a false barge in.

10 Claims, 3 Drawing Sheets

HANDLING OF SPEECH RECOGNITION IN A DECLARATIVE MARKUP LANGUAGE

CROSS-REFERENCE TO RELATED APPLICATION

This application claims priority from U.S. patent application Ser. No. 09/887,750, filed on Jun. 21, 2001, now U.S. Pat. No. 6,941,268 issued 6 Sep. 2005, entitled "HANDLING OF SPEECH RECOGNITION IN A DECLARATIVE MARKUP LANGUAGE," by Porter et al., and assigned to the assignee of the present application, which is herein incorporated by reference.

BACKGROUND OF THE INVENTION

1. Field of the Invention

This invention relates to the field of declarative markup languages for describing speech applications as state machines. More specifically, the invention relates to improved methods and systems for solving speech recognition problems in such a programming language.

2. Description of the Related Art

Prior to the advent of VoiceXML (Voice Extensible Markup Language) and its precursor languages, VoxML, SpeechML, and others, speech applications were described (or programmed) using standard programming techniques, e.g. C/C++ programs that made function (or object invocation) calls to lower level device drivers and speech recognition engines. For example, companies such as Nuance Communications, Inc., Menlo Park, Calif., and SpeechWorks International, Inc., Boston, Mass., have developed sophisticated automated speech recognition (ASR) systems and provide complex C/C++ interfaces called software developments kits (SDKs) to allow customers to develop systems.

Both companies have also provided higher level building blocks (and development tools) for speech applications. However, these approaches are vendor specific, e.g. a C program designed for the Nuance SDK would not necessarily run with each using the SpeechWorks SDK, and vice versa.

Tellme (as well as other companies such as AT&T, Lucent, IBM, and Motorola) investigated the use of declarative markup languages to describe applications as state machines. AT&T, Lucent, IBM & Motorola ultimately each took declarative markup languages for speech they created separately and proposed a common standard, VoiceXML, that has been submitted to standards bodies, e.g. the World Wide Web Consortium (W3C).

The advantage of using a language such as VoiceXML is that application programmers can describe their application without regard to a specific ASR. Thus, a type of platform independence of the type seen on the World Wide Web with hypertext markup language (HTML) is possible.

However, one disadvantage is that application programmers are limited to the feature set of VoiceXML and the ability to access vendor-specific features is limited. The state-machine model used by VoiceXML in turn leads to several problems surrounding the ability to handle list navigation, false accepts, and other features. For example, the voice application state machines defined by the language support "barge in" (allowing a user to speak before queued audio prompts are finished playing), but the language does not expose information about the point in time at which the barge in occurred to the application programmer.

Early uses of VoiceXML at Tellme Networks, Inc., attempted to address the "shoot the duck" problem (hereinafter described) using a variety of ECMAScript (better known as JavaScript) variables to create and start timers. However, the execution model of VoiceXML is such that prompt playback timing is independent of interpretation timing, hence the foregoing method only results in a rough approximation and requires that the programmer have access to, or prior knowledge of the length of every prompt. To better understand this consider the following, extremely small VoiceXML code fragment:

```
<form>
    <var name="starttime"/>
    <var name="endtime"/>
    <block>
        <audio src="file1.wav">File 1 here</audio>
        <assign name="starttime" expr="current.time( ) "/>
        <audio src="file2.wav">File 2 here</audio>
    </block>
    <field name="foo" type="boolean">
        <property name="timeout" value="0 "/>
        <filled>
            <assign name="endtime" expr="current.time( ) "/>
            <assign name="duration" expr="endtime - starttime"/>
        </filled>
    </field>
</form>
```

The time returned would be milliseconds of playback timing after the mark was encountered in the prompt playback queue. Accordingly, the application programmer thinks she has recorded the starting time for the playback of the second prompt, e.g. "file2.wav" and may plan to set a second variable, endtime, to the current time when "#state2" is entered to then compute the time for barge in through subtraction, but in actuality though, the VoiceXML execution model is such that all of the JavaScript for the current state is executed while the prompts are being cued.

Thus, while subtraction of starttime and endtime JavaScript variables would result in a fairly good approximation of the time from the start of all audio playback for a given VoiceXML state and the entry into the next VoiceXML state, it will not be relative to the apparent position of the <var/> declaration in the code or the second prompt. Thus to perform any calculations about barge-in it would be necessary to know the playback time of all audio prompts for the previous VoiceXML state. This may be impossible to determine in the interpreter if speed-adjusting technologies are used to increase playback speeds and reduce pauses between words. Thus the apparent file size/sampling rate may not be the same as playback time.

Accordingly, what is needed is a method and system for addressing the above problems.

SUMMARY OF THE INVENTION

Figure 1:
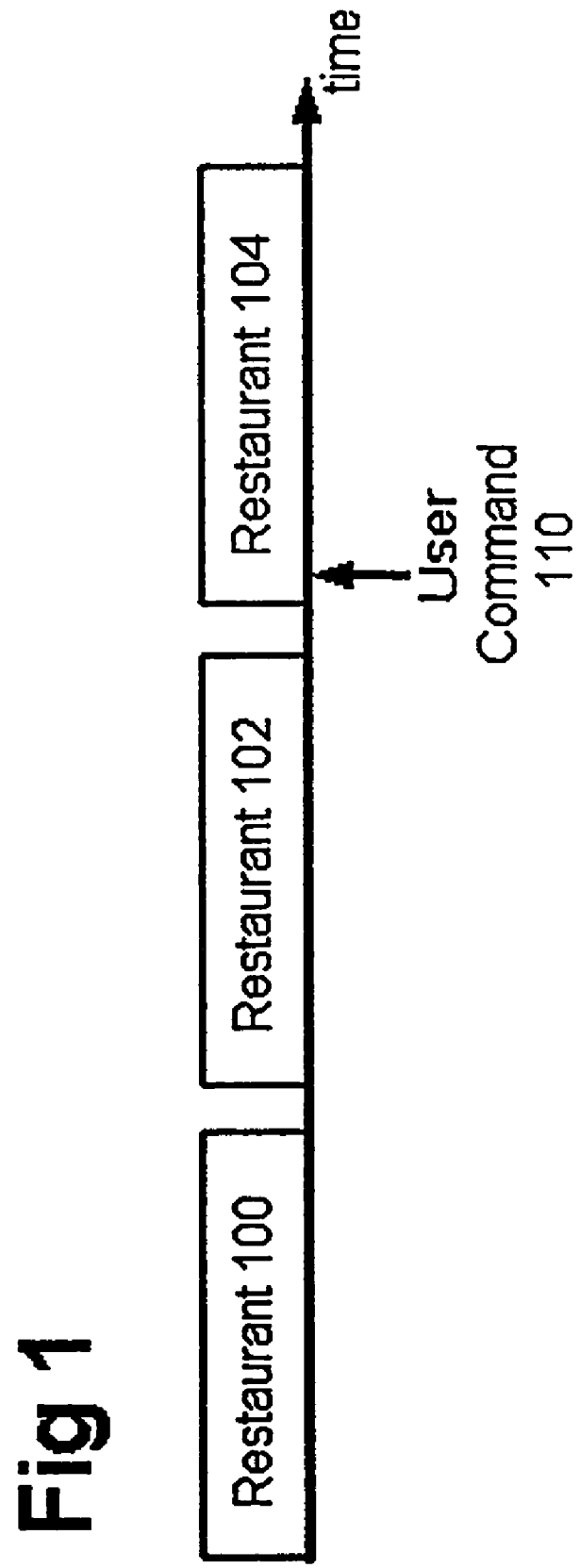
FIG. 1 illustrates the list navigation problem in a speech application.

Accordingly, what is needed is a method and apparatus for reliably and simply determining barge in times in a declarative markup language for speech applications to enable better list navigation, handling of false accepts, and other recognition and speech application problems. Declarative markup languages for speech applications such as VoiceXML are becoming more prevalent programming modalities for describing speech applications. Present declarative markup languages for speech applications model the running speech application as a state machine with the program specifying the transitions amongst the states. These languages can be extended to support a marker-semantic to more easily solve several problems that are otherwise not easily solved. In one embodiment, a partially overlapping target window is implemented using a mark semantic. Other uses include measurement of user listening time, detection and avoidance of errors, and better resumption of playback after a false barge in.

Focusing on the list navigation problem, at present, a VoiceXML program (or other program written in a declarative markup language for speech) is likely to have a "shoot the duck" problem for list navigation. The problem arises because the human response latency to aurally presented information (e.g. hearing a list item) can cause a user command to occur after the next list item has started to playback (e.g. the application now thinks the current item is the one after the one the user is trying to act on). Thus, the end user is trying to "shoot the duck", or list item as it were, by saying their command quickly enough that it registers for the item they were trying to act on.

One solution to this problem is to create an overlapping target window that extends into the start of playback of subsequent items. As a technical approach to this problem, a marker-semantic is introduced to VoiceXML, e.g. <mark/>. By placing these markers into the program code, the running application can access information (at runtime) about how far past the last mark in the audio the program is (as of when barge in occurred, or the end of audio playback occurred). In turn, the resulting offset time from the last mark allows for implementation of a partially overlapping target window by looking at the time since the mark and the time a command was received. If less than, for example one second, has passed, then the command is applied to the previous list element.

DETAILED DESCRIPTION

1. Introduction

An approach to exposing information about barge in a declarative markup language for speech applications is described. The approach can then be applied to solve several problems that are not easily addressed in such languages.

First, the problems present in existing declarative markup languages for speech applications will be presented. Next, a technical solution will be presented that is particularly well suited for VoiceXML (version 2.0 and up) and finally the application of the solution to the problems discussed will be considered.

2. Problems in Declarative Markup Languages

Shoot the Duck, aka List Navigation

List navigation is a somewhat difficult problem in speech applications. This is especially true given the state machine model presented by declarative markup languages such as VoiceXML. The problem is reasonably well known, and occurs because a users command in a list may follow the start of playback of the next item.

FIG. 1 illustrates one example of the problem. Specifically, a list (in this case of restaurant names) is being played back in time (moving forward from left to right). The time spent by the system reading information is represented graphically by the horizontal space taken up on the time line. The space between the restaurants represents small gaps of silence between playback of list Items. The size of this gap will vary from system to system and application to application. Here the system is reading back information about restaurant 100, then restaurant 102, finally as the information about restaurant 104 is starting to be played the user issues a command 110 (e.g. an audible/verbal command "that one", "tell me more", "repeat", or a touch-tone command having an assigned meaning).

The likely result of the user command 110 though is that the wrong information will be acted on. In FIG. 1, because the playback of restaurant 104 already started, the command, e.g. "that one", "tell me more", etc., is likely to be applied to the restaurant 104. In reality though, the user has heard so little of the audio for restaurant 104 that they probably were actually trying to act on restaurant 102.

Figure 2:
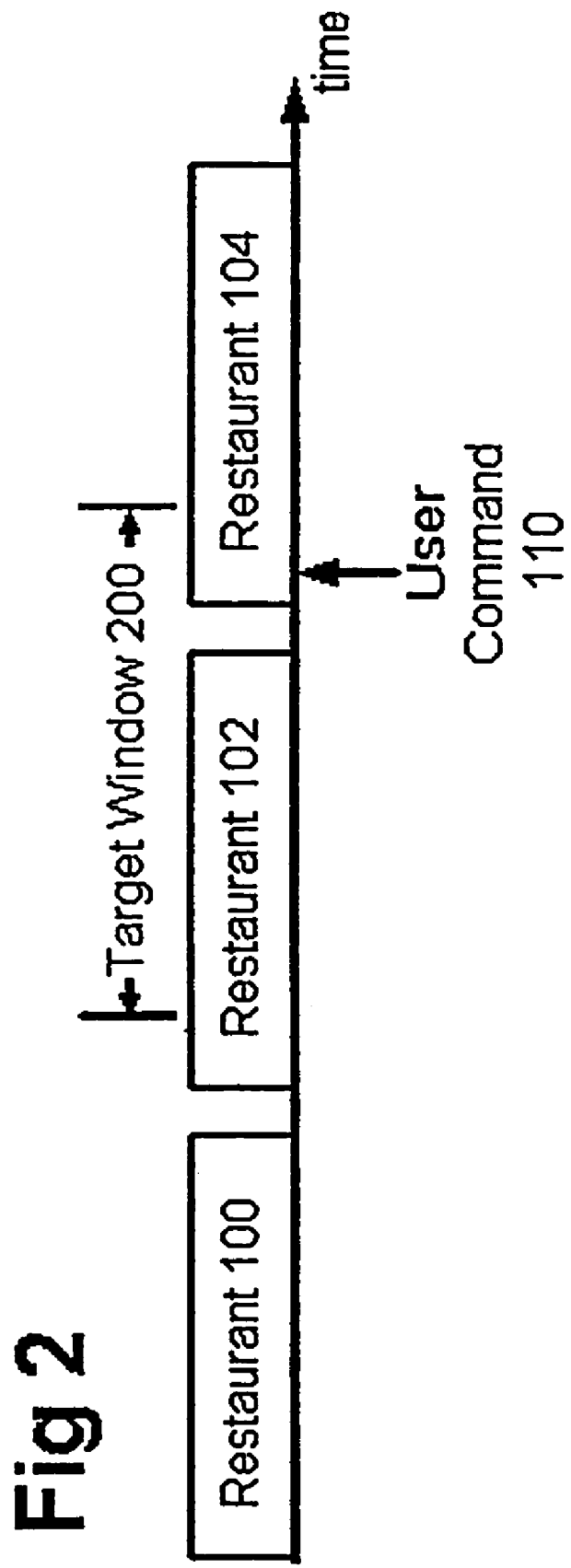
FIG. 2 illustrates the use of a partially overlapping target window in connection with the list navigation problem in a speech application.

This can be addressed by using a partially overlapping temporal window as shown in FIG. 2. Here, a target window 200 that partially overlaps multiple list elements is shown. Thus, in FIG. 2, the boundaries of the target window 200 are used to identify the applicable list item to which the user command 110 applied. Thus here, the command 110 is correctly applied to the restaurant 102.

Unfortunately, implementing a (sliding) partially overlapping target window with VoiceXML, in particular, and declarative markup languages for speech is generally difficult. That is because the semantics of the language/state machine do not easily afford access to when the user command 110 was given (either in absolute terms or relative terms).

Relatedly, if an advertisement, or other actionable content, precedes presentation of list items then a command (e.g. "tell me more") may be erroneously applied to the first list item rather than the advertisement, e.g. the shoot the duck problem again. This can be solved as described herein.

Measuring Advertisement Barge in

Because VoiceXML and other declarative markup languages are general purpose in nature, the language design did not specifically contemplate issues relating to playback and placement of advertisements. At a general level, when audio is being played back, VoiceXML allows the audio to either be bargeable or non-bargeable. From an usability standpoint, experienced users may quickly become frustrated if they are always required to listen to all of an advertisement before being able to complete their tasks. In contrast, the advertisers will be disappointed (and consequently pay less) if their advertisements are being barged-over by users. Consequently, it would be useful to be able to enable barge-in while tracking how much of an ad has been listened to by each user for, inter alia, ad reporting and billing purposes.

Inferring User Intent Based on Time

Figure 3:
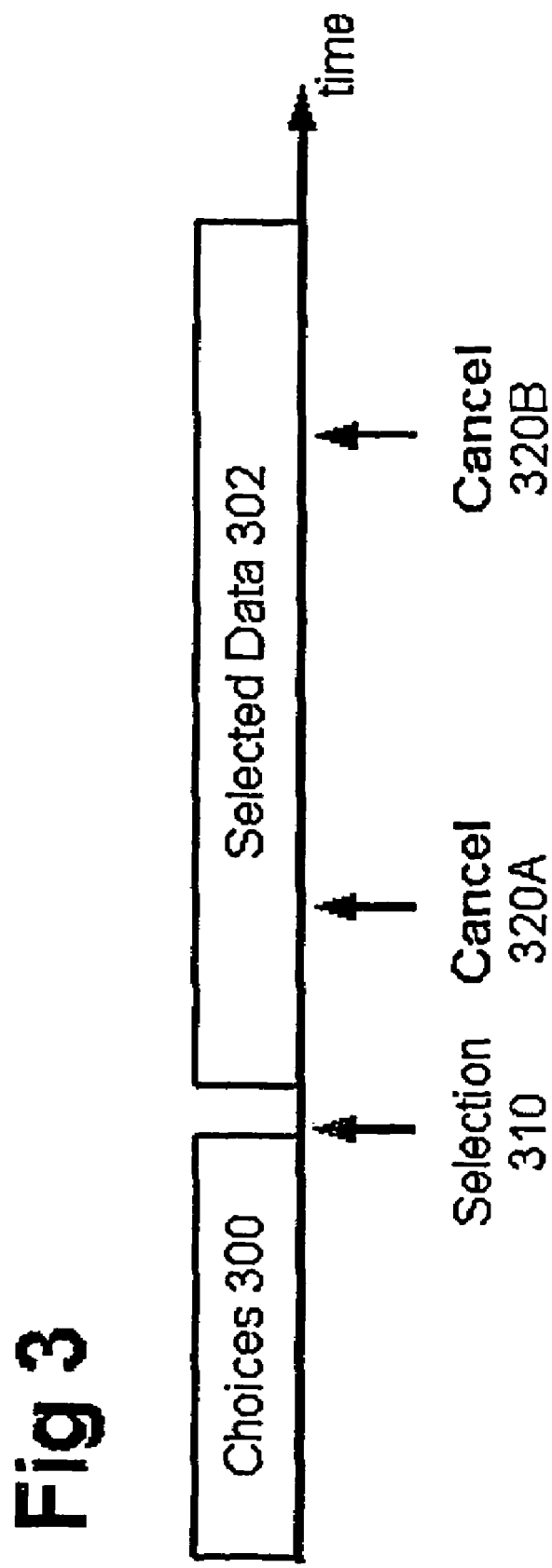
FIG. 3 illustrates the problem of inferring user intent in a speech application.

In speech recognition, when the user speaks it is possible that a "false accept" can result, e.g. the ASR treats your utterance as a particular option when in fact the user said something else (possibly out of grammar). FIG. 3 will be used to illustrate this problem. Here, several choices 300 are presented to the user, e.g. college basketball team names.

The user makes a selection 310, "Boston", and the selected data 302 begins to playback, e.g. sports scores. When the user selection 310, or utterance, is correctly recognized as Boston, the selected data 302 will correspond to the sports scores for Boston. However, if a false accept occurs, e.g. instead the ASR recognized "Austin", the wrong team's scores will be played.

FIG. 3 shows two possible times when the user might cancel playback, e.g. say "stop", "go back", "cancel", etc., as cancel 320A and 320B. Much like the ad barge-in detection problem, at present VoiceXML does not provide a clean mechanism for distinguishing between the cancel 320A and the cancel 320B temporally.

If it were possible to distinguish the two temporally, the first (cancel 320A) might be treated as a false-accept and the user can then be re-prompted or other some other appropriate action may be undertaken.

False Barge in Handling

Another problem not easily addressed in VoiceXML is handling false barge in, e.g. where the recognizer stops playback in order to permit (perceived) user speech. At that point, if no recognition results, e.g. <noinput/> or <nomatch/>, it may be desirable to seamlessly resume audio playback. The problem: where to resume. This is especially true in a long audio file where just resuming at the start of the file is not very satisfactory from a user experience stand point.

3. Technical Solution

Having considered several problems in declarative markup languages for speech recognition and VoiceXML (versions 0.9, 1.0 and 2.0 as currently proposed) in particular it is now useful to consider a technical solution.

I. Because the solution should be broadly compatible with industry standards it is helpful if it be implemented in a fashion that permits interoperability with the standard. Several possibilities present themselves: (1) Use <object/> to provide a VoiceXML interpreter specific tag, e.g. "com.tellme.barge in", for measuring barge in and reporting details; (2) use a VoiceXML interpreter specific shadow variables, e.g. "com.tellme.bargein", "fieldname$.bargeintime", etc., for measuring barge in and reporting details; (3) extend the semantics of an existing VoiceXML tag to facilitate wide spread adoption.]

For purposes of this discussion, consider the latter option—an expanded semantic for an existing tag—however, any of the three implementations could be used.

One tag that lacks good semantic definition and that is ideal for extension is the <mark/> tag (actually part of the Speech Synthesis Markup Language (SSML) W3C proposed standard, but incorporated by reference into VoiceXML). The drafts of SSML, see <http://www.w3.org/TR/speech-synthesis>, define a <mark/> element at Section 2.11 without providing any semantic meaning with-respect to VoiceXML. The proposed SSML draft would have the "speech synthesizer throw an event" upon reaching the mark. However, the use of this thrown event in VoiceXML is undefined. (N.B. <mark/> is technically not a part of VoiceXML 2.0, as proposed.) Also, in SSML/text-to-speech contexts marks are used as static way points for navigation through long pieces of text like bookmarks, without regard to timing issues.

Accordingly, the VoiceXML interpreter can be configured to respond to the event thrown during speech synthesis by the <mark/> tag by setting one or more JavaScript variables that specify the name of the most recent <mark/> that was reached. For example consider the following small snippet of a VoiceXML program:

```
...
<mark name="mark1"/>
<audio src="file1.wav">Should have played file 1
here</audio>
<mark name="mark2"/>
<audio src="file2.wav">Should have played file 2
here</audio>
<audio src="file2det.wav">Should have played more detail
about file 2 here</audio>
...
```

If the user barges in during the playback of "file1.wav" then the JavaScript variable specifying the most recent marker would have the value "mark1" and another JavaScript variable would have the amount of time, e.g. 120 (representing 120 milliseconds) since that mark tag ("mark1") was encountered prior to audio playback stopping.

Note the meaning and representation of the time result. A relative offset is used as opposed to an absolute time or a-percentage of the subsequent audio file(s) played. An absolute time would be difficult to work with programmatically unless two times were returned, e.g. the time the mark was encountered and the time of the barge in, thus allowing the relative time to be computed. A percentage may be even more difficult to work with for the application programmer (especially because the length in time of the audio files is not necessarily known at application programming time and is not, as specified in VoiceXML, exposed in the state machine/runtime environment).

In other embodiments, a data structure containing times for multiple previous marks is exposed by the interpreter for the declarative markup language. For example, it might be possible to locate not just the time since reaching the most recent marker, but also the time since reaching one or more previous markers. This capability may be helpful if multiple problems of the sort discussed above are being addressed in a single application in relative close proximity (application state wise).

Additionally, from an implementation standpoint for VoiceXML a determination should be made as to the handling of markers in conjunction with the variable scoping rules and, in particular, the <subdialog/> functionality for invoking additional code. In one embodiment, the <subdialog/> scope allows access only to markers defined within the subdialog (thus on return from the <subdialog/> any access to marker times will be from the most recent marker in the code that invoked the subdialog.) This approach would facilitate transparent use of markers in an application programmer's code even across invocations of "library" functions, e.g. subdialogs, written by others. Other access semantics for markers could be implemented as well, e.g. until a subdialog declares a <mark/> it can access the calling scope's most recent mark, single mark context for entire "thread" of execution within the language (e.g. one call session has a single last marker/fine irrespective of calls to subdialogs or invocations of new applications, etc.) This same class of decisions can be made for other similar tags in VoiceXML, as well as other declarative markup languages for voice applications. In one embodiment, this behavior of marks within subdialogs can be controlled on a per-application basis.

4. Application of Solution to Problems

Shoot the Duck, aka List Navigation

Returning to FIG. 2, with the <mark/> construct and semantics described above it becomes easier to programmatically implement a partially overlapping target window (of fixed length). Specifically, prior to starting audio playback (<audio/> and <prompt/> tags in VoiceXML) of each list item a predetermined mark is placed, e.g. <mark name="listitemboundary"/>.

Then, for a predetermined set of commands (e.g. particularly list navigation commands and list actions commands), the VoiceXML program code (and invoked JavaScript) can check for the most recent marker name, e.g. "listitemboundary", and the time from when it was reached to when speech started, e.g. "100", etc.

In one embodiment, a predetermined period into the next prompt is counted as part of the partially overlapping target window, e.g. less than one second. Thus, if the time is less than the predetermined amount the command is treated as applying to the "previous" list item. For example if in the program that played the list shown in FIG. 2, the <mark/> could be placed between the program statements for playing each of the restaurant audio (e.g. one would be between restaurant 100 and 102 and another between restaurants 102 and 104).

At the time of the user command 110, the "current" item from the perspective of the VoiceXML program is the restaurant 104 (e.g. if a looping construct is being used to iterate through audio files, then the value of the loop iterator is 3, 2 if counting from 0). However, because in this example, the user command 110 occurred less than a predetermined amount of time after the last mark, e.g. <one second, the command will be applied to the "previous" item, e.g. the restaurant 102 or by subtracting one from the loop iterator (some special checks may need to be included to handle the first element).

In other embodiments, the length of the predetermined period is varied for more experienced users, e.g. based on number of past calls to the system, previous response times, and/or other criteria. Thus for example, for a regular caller of the service the time allowed might only be one-half second, while for an elderly caller who has been responding more slowly two or more seconds might be allowed (and the pause between items extended as well).

Measuring Advertisement Barge in

This is now straightforward and the results are precise and exposed to the running VoiceXML program. In this case, a mark can be placed at the start of the advertisement audio/prompt tags. Program code can then take appropriate actions, e.g. log the barge in, turn off barge in for future ads, etc.

For example, in one embodiment, barge in is initially enabled for advertisements for a user. However, if it is determined that a user is regularly barging info the advertisements in the first second, barge in might be turned off on that user's subsequent calls, or just turned off for the first few seconds. (N.B. in VoiceXML, barge in is a boolean attribute, either enabled or disabled; therefore, timed bargeability would either be a language extension or an implementation specific feature; although, this can simulated to some extent by breaking a single prompt into several smaller prompts of which the first have barge in turned off.)

Another use—slightly outside the field of advertising and more related to usability and detecting bad calls—is that if too many errors are being generated, e.g. no match, quick interruption of prompts followed by cancel or errors, etc., for early command prompts, barge in is deactivated to encourage (actually force) users to listen to a prompt completely before speaking.

Inferring User Intent Based on Time

As noted above, and shown in FIG. 3 it may be possible to infer user intent—or at least avoid repeating an error—by measuring the time from when audio relating to one user request starts to play until a cancel type command is issued by the user.

In one embodiment, a subset of the commands the user can say are identified as being "cancel" type commands. In many common voice applications, they are the commands such as: "go back", "return", "cancel", "stop", "no", "no stop", and/or other similar commands. Ultimately, the specific list of commands will be application and context specific. The handling is that when one of these commands is detected the program checks the time since the mark and if the time is less than a predetermined amount, e.g. less than one second, then an inference is made that the user is signaling to the application that an error, probably speech recognition, occurred.

Having determined that the cancel command came quickly, the situation can be handled in one of several ways. One approach is to explicitly ask the user whether a mistake was made, e.g. "Sorry, sounds like I made a mistake, did I pick the wrong sports team, Say yes or no.", or the like. Another approach is to treat the cancel commands as a request to go back to the last place—rather than their normal behavior—for example, "Sorry, wrong team. Say the name of the team or 'Menu' to go to the menu", instead of returning to the menu directly for "Menu", etc. Still other approaches can be used depending on the needs of the particular application. For example, treating the majority of the cancel commands as a request to re-enter the selection 310, e.g. by reprompting such as: "Ok, give me another sports team . . . "

If a further attempt is made to determine the user's choice (e.g. to give the user a chance to either reenter the selection 310 or hear the correct data 302) there are several possible further embodiments.

One embodiment does not explicitly request further user input. In this configuration, the VoiceXML program accesses other data or requests that the recognizer return the next best result. (N.B. this is not currently supported in VoiceXML.)

In another embodiment, the user is prompted to repeat her/his utterance, but the previous choice (now established as "incorrect" by the user's quick cancellation) is excluded from being selected by the recognizer. The above is most easily supported when the program is able to provide a list of one or more elements that should not be recognized and/or when the program can access the n-best list (or other similar construct) to choose the best result not on the list of excluded items.

See also, discussions herein regarding further complexities in addressing this problem.

False Barge in Handling

The problem of false barge in was already discussed briefly above. However, a fuller discussion is useful to consider. Although humans can do a relatively good job at comprehending other humans even in loud/noisy environments, speech recognition systems do not fare as well and when you add in the (poor) quality of many (wireless) telephone networks, the situation gets worse. Other factors such as road noise, stadium noise, bar noise, etc., all make the problem worse. All of those noises might be considered by the speech recognition system as a cue that speech has started—a false barge in.

However, when no valid grammar item is detected, e.g. <nomatch/>, there are several problems. The first is how to resume audio playback at a meaningful point. In one embodiment, the program can automatically request resumption of playback (at the correct offset from the most recent mark), e.g. a VoiceXML interpreter/implementation specific tag). In another embodiment, the programmer can specify a temporal offset in a file as part of an <audio/> tag (or group of tags). For example, <audio src="file1.wav" offset="500 ms"/>, etc. Or <resume frommark="mark1" offset="500 ms"/>, etc. A second problem is preventing repeated false barge ins. This can be addressed by turning off barge in, e.g. after a predetermined number of barge ins and/or switching to "magic word" mode. In "magic word" mode, a barge in does not occur until a recognition match in an activate grammar occurs, with sufficiently high confidence.

One subtlety introduced by resumption of playback and marker tags is how to handle the time counter. In one embodiment, a resumption of playback starts the marker at the existing point, e.g. if the offset is 500 ms and playback resumes and then is stopped again the marker is 501 ms. In another embodiment, the marker has an offset subtracted from it when playback resumes. In another embodiment, a marker's reset behavior on playback resumption can be controlled in the application program, e.g. <mark name="mark1" resumebehavior="reset"/>, etc.

5. Alternative Embodiments

Thus far in solving the problem of inferring user intent the focus has been on the receipt of a "cancel" type command shortly after playback of information. However, the problem is slightly more complex when instead of issuing a cancel command, the user repeats one of the main options. Returning to the example used of picking a sports team and FIG. 3 may be helpful to understanding this issue.

Upon hearing the start of playback of the selected data 302, the user may quickly realize that she is hearing the wrong team, e.g. "Austin" instead of "Boston" and instead of saying "stop", etc., may repeat their previous utterance, e.g. "Boston". This problem in turn should be considered in the context of moded vs. unmoded applications. In a moded application, the application transitions from a mode, e.g. team selection mode, to another mode, e.g. data playback mode, where selection commands, e.g. team names, can no longer be spoken. In contrast an unmoded application allows the user to enter new selections (e.g. the selection 310) even during playback of data.

For clarity, the two cases will now be considered separately.

Case 1: Unmoded Application/Selections Possible During Data Playback

Here, the application is designed to allow users to say a sports team, e.g. make a selection 310, at any time. An example of an unmoded application can be found in the Tellme consumer service, reachable at +1(800)555-TELL, stocks and sports applications that allow users to easily move from hearing the selected data 302 (e.g. a sports score or a stock quote) to hearing the relevant data for another team or stock.

When there is any spoken command given (e.g. the cancel 320A will now represent any command, e.g. "cancel" or "Boston") its temporal offset relative to the start of playback (as determined from use of a <mark/>) can be considered in deciding how to interpret the command. Cancel-type commands can be handled as described above.

For other commands, e.g. other selections there are several strategies that can be adopted:

I. add the command for the currently playing data to a list of excluded items and then perform speech recognition on the new utterance. (N.B. there may be multiple items on the list of excluded items if there multiple phonotactically similar grammar options and the recognizer keeps picking the "wrong" one.)

II. compare the speech recognition results of the second utterance with those already known for the first. Analyze the n-best list (ordered ranking of most likely recognition results) for each utterance while excluding the previous choice(s) to select an option (several possible selection strategies, e.g. sum of confidences, average of confidences, etc.)

III. explicitly confirm recognition result of speech recognition on second utterance, e.g. "I heard you say Boston, is that correct? Say yes or no."

IV. Use original n-best list (or new n-best list, or the union or intersection of the two) to present choices in a list format—with user being asked to say "that one" or similar to disambiguate (N.B. usefulness of above described shoot the duck solution for list navigation here).

As the strategies above suggest, there are several ways to handle the second utterance. Also, the above strategies may be used in combinations and/or with a different strategy used the second or third time a mistake occurs in quick succession. For example, after the second utterance of "Boston", the first approach described above might be used. However, if the user interrupts again quickly, either of third or fourth approach might be used.

Similarly, if a particular grammar has a large number of phonotactically similar options the strategy selected can be adjusted further by the application programmer. For example, a grammar of United States equity issues (Stocks/company names/ticker symbols) is fairly large (thousands of options) with many phonotactically similar options. In such a case the starting strategy upon inferring that an error occurred might be the fourth approach, e.g. "Sorry, when you hear the stock company name you want, say 'tell me more' . . . Cisco Corporation . . . Sysco Foods . . . ."

Case 2: Moded Application/Selections not Possible During Data Playback

Turning now to moded applications where it is not generally possible to make a "high level" selection while listening to the data. In VoiceXML from a programmatic standpoint this would mean that during playback of the selected data 302, the grammar containing the college basketball team names is no longer active.

More specifically, at the point where the selection 310 is made a first grammar, "MenCollBasketballTeamChoices", would be active and then at a later point, e.g. when the cancel 320A (or 320B) came, a second grammar, "ScoreNavigationCommands", would be active. Since the second grammar does not include the options from the first grammar then one of two things will happen if the user repeats a sports team name the speech recognizer will either: (i) false accept the team name as one of the options in the second grammar or (ii) correctly reject the team name as out of grammar, resulting in a <nomatch/>.

Two strategies for handling the second utterance will now be considered.

Strategy 1: Attempt to Recognize Second Utterance

To enable the sports team name to be recognized it would be necessary to process the cancel 320A utterance through the previously active sports team grammar, e.g. "MenColl-BasketballTeamChoices", as well as the currently active grammar. Then the results, and confidences in the results, for each grammar could be considered.

For example, if the repeated utterance of "Boston" (as the cancel 320A) occurred, and resulted in a false accept for "Go Back" but the value for the previous grammar (excluding "Austin") was "Boston" with a higher confidence than the confidence for "Go Back", the application would select Boston as the utterance—and go back to the previous field/state, etc.

This approach involves multiple active grammar hierarchies and will require significant additional support, e.g. to roll back the state machine and/or other variable changes. Further, VoiceXML in particular, does not readily support semantics for comparing the quality of results under two different grammars. Accordingly, implementing this in VoiceXML may require implementation specific hooks for performing speech recognition, referencing the previously active set of grammars (VoiceXML supports hierarchical grammars), and efficiently moving interpreter state back to the previous field as if a match on the newly identified option has occurred.

Thus, a more moderate strategy can be adopted.

Strategy 2: Handle as Gracefully as Possible

Without support to roll back grammars, it is difficult to gracefully handle the situation of FIG. 3. Accordingly, strategies should be carefully selected on a per-application/per-instance basis.

For example, one strategy might be to treat <nomatch/> utterances as attempts to repeat the selection and thus add the current item to an exclude list and return execution to the state in which selections can be made, e.g. <goto/>. However, this strategy fails to account for the fact that the ASR can falsely reject correct utterances, e.g. the user says "tell me more" and the ASR returns <nomatch/> even though "tell me more" is an in grammar utterance.

However, some strategies may be more generally useful, for example the time offset from the <mark/> could be used to lengthen the help prompt on a <nomatch/> after a barge in that occurs in less than a predetermined period, e.g. "Sorry, I didn't get that, if you want to select another team say 'new team'" as opposed to "Sorry, I didn't get that".

Ultimately, handling repeated utterances of the selection in moded applications will be slightly more difficult than in unmoded applications. Accordingly, it may be a useful design pattern to focus on unmoded applications when possible.

6. Conclusion

In some embodiments, processes and apparatus for improved list navigation in a declarative markup language for speech applications can be implemented using hardware based approaches, software based approaches, and/or a combination of the two. In some embodiments, the interpreter for the declarative markup language uses one or more computer programs that are included in one or more computer usable media such as CD-ROMs, floppy disks, or other media.

Some embodiments of the invention are included in an electromagnetic wave form. The electromagnetic waveform comprises information such as the interpreter and associated application programs written for the interpreter, e.g. an application program that performs list navigation with a partially overlapping target window. The electromagnetic waveform may include the programs accessed over a network.

The foregoing description of various embodiments of the invention has been presented for purposes of illustration and description. It is not intended to limit the invention to the precise forms disclosed. Many modifications and equivalent arrangements will be apparent.

What is claimed is:

1. A method of determining an applicable list item for a command input received in list navigation of a list comprised of a sequence of list items during execution of a voice application program written in a declarative markup language using a computer system, the method comprising:

determining a current list item corresponding to the list item in the sequence of list items that is either: (a) currently being played back by the computer system; or (b) was the most recent list item already played back by the computer system;

exposing within a runtime environment of the declarative markup language a relative time corresponding to an amount of time from the start of playback of the current list item until when the command input was received;

comparing the relative time to a predetermined time corresponding to an amount of allowed target window overlap; and selecting the applicable list item based on the comparing and the current list item.

2. The method of claim 1, wherein the selecting comprises setting the applicable list item to the current list item when the relative time is greater than the predetermined time.

3. The method of claim 1, wherein the selecting comprises setting the applicable list item to the current list item when the relative time is greater than or equal to the predetermined time.

4. The method of claim 1, wherein the previous list item comprises the list item preceding the current list item in the sequence of list items and wherein the selecting comprises setting the applicable list item to the current list item when the relative time is less than or equal to the predetermined time.

5. The method of claim 4, wherein if the current list item comprises first list item in sequence of list items, then the previous list item comprises the current list item.

6. The method of claim 1, wherein the previous list item comprises the list item preceding the current list item in the sequence of list items and wherein the selecting comprises setting the applicable list item to the current list item when the relative time is less than the predetermined time.

7. The method of claim 1, wherein the command input comprises a command selected from the set "that one", "buy it", "tell me more", "more", "previous", "next", "delete", and "repeat".

8. The method of claim 1, wherein the voice application program has a corresponding executable program code and wherein the executable program code further includes at least a first markup tag for indicating that subsequent tags comprise playback of a list item, and wherein the exposing the relative time comprises setting a variable in the runtime environment to correspond to the amount of time from when the first markup tag was encountered until the command input was received by the computer system.

9. The method of claim 1, wherein the list comprises a list of items for purchase and wherein the command input comprises a request to purchase the applicable list item.

10. A computer-usable medium having computer-readable program code embodied therein for causing a computer system to perform a method of determining an applicable list item for a command input received in list navigation of a list comprised of a sequence of list items during execution of a voice application program written in a declarative markup language using a computer system, the method comprising:

determining a current list item corresponding to the list item in the sequence of list items that is either: (a) currently being played back by the computer system; or (b) was the most recent list item already played back by the computer system;

exposing within a runtime environment of the declarative markup language a relative time corresponding to an amount of time from the start of playback of the current list item until when the command input was received;

comparing the relative time to a predetermined time corresponding to an amount of allowed target window overlap; and selecting the applicable list item based on the comparing and the current list item.

* * * * *

UNITED STATES PATENT AND TRADEMARK OFFICE
CERTIFICATE OF CORRECTION

| | | |
|---|---|---|
| PATENT NO. | : 7,321,856 B1 | Page 1 of 1 |
| APPLICATION NO. | : 11/197483 | |
| DATED | : January 22, 2008 | |
| INVENTOR(S) | : Brandon W. Porter et al. | |

It is certified that error appears in the above-identified patent and that said Letters Patent is hereby corrected as shown below:

On the Title Page
Item (75), under "Inventors", line 6, delete "Bill" and insert -- Philip --, therefor.

Signed and Sealed this

Fifteenth Day of February, 2011

David J. Kappos
*Director of the United States Patent and Trademark Office*